United States Patent [19]

Roussin

[11] 4,189,158

[45] Feb. 19, 1980

[54] GAS LOADED FACE SEAL

[75] Inventor: Michael A. Roussin, Peoria, Ill.

[73] Assignee: Caterpillar Tractor Co., Peoria, Ill.

[21] Appl. No.: 18,705

[22] Filed: Mar. 8, 1979

[51] Int. Cl.² .......................... F16J 15/36; F16J 15/40
[52] U.S. Cl. ...................................... 277/34.3; 277/42;
277/74; 277/92; 277/95; 305/11
[58] Field of Search .................................. 305/11–13;
277/34, 34.3, 34.6, 42, 43, 74, 92, 95, 226

[56] References Cited

U.S. PATENT DOCUMENTS

| | | | |
|---|---|---|---|
| 2,843,349 | 7/1958 | Meyer | 277/34 X |
| 2,906,562 | 9/1959 | Burgman | 305/11 |
| 3,170,700 | 2/1965 | Adams | 277/74 X |
| 3,195,421 | 7/1965 | Rumsey et al. | 305/11 X |
| 3,637,222 | 1/1972 | Wilkinson | 277/34 |
| 3,674,279 | 7/1972 | McMurray et al. | 277/95 |
| 3,947,045 | 3/1976 | Schmidt | 277/42 X |

FOREIGN PATENT DOCUMENTS

| | | | |
|---|---|---|---|
| 754340 | 1/1952 | Fed. Rep. of Germany | 277/34.3 |
| 257688 | 9/1926 | United Kingdom | 277/34.3 |

*Primary Examiner*—Robert S. Ward, Jr.

*Attorney, Agent, or Firm*—Wegner, Stellman, McCord, Wiles & Wood

[57] ABSTRACT

A seal (44,144) between two relative movable structures (14,30) is provided. The seal has a hollow chamber (50) which is gas filled either permanently or when desired. The seal (44,144) has a driving portion (46,146) which may be of the same or of different material from a sealing portion (48,148) with the two portions integrally formed or sealingly joined together. A sealing band or contact surface (57) is provided on the sealing portion (48,148) which has a sealing lip (56) in contact with a facing surface (41) and maintains a substantially constant face angle during axial displacement of the two structures (14,30). The internal gas pressure in the seal may be varied depending on the environmental and temperature conditions and, once sealed, the amount of pressure may be either permanently maintained or changed when desired. It is contemplated that if the material of the seal or any portion thereof has a high permeability to the gas in the seal, a thin membrane (70,170) of material having a low permeability to the gas can be provided in the chamber (50) to protect said high permeability material.

21 Claims, 4 Drawing Figures

GAS LOADED FACE SEAL

DESCRIPTION

1. Technical Field

This invention relates to a seal and, more particularly, to a gas-filled seal for use between two relatively movable members.

2. Background Art

Seals between two members, even relatively movable members, are well known and have made use of special materials, have been gas filled and have employed special geometric shapes to effect the seal.

U.S. Pat. No. 3,788,651, in the name of Brown et al, issued Jan. 29, 1974, has an inflatable seal with the body of the seal nested in a recess and gas being used to inflate the seal to urge a flexible wall against a facing surface. One or more layers of special fabric reinforcement encircle the inflatable chamber to aid in effecting the seal between the two members exposed to steam at high pressure. The seal is primarily affective only with static, non-relatively movable members, such as between a door and body of a pressure vessel.

U.S. Pat. No. 3,947,045, in the name of Schmidt, issued Mar. 30, 1976, shows a seal for a shaft rotating relative to a stationary housing. A sealing element is channel-shaped, nesting in a recess between the movable and non-movable parts with the opening to the channel facing a source of pressurized gas or fluid. Spring clips retain the flaps or legs of the channel against the parts so that gas or fluid under pressure will urge the flaps against the respective walls of the recess to effect the seal. The seal can only be used where the joint between the relatively movable parts is under a pressure, such as a gas or fluid under pressure.

U.S. Pat. No. 3,841,718, in the same of Reinsma, issued Oct. 15, 1974, has a crescent-shaped seal ring partially encompassing a load ring which urges the two legs of the crescent into sealing contact with two relatively movable parts. The load ring provides the principal force for urging the sealing ring into an effective sealing relationship with the seal. Under certain conditions the axial spacing that can exist between the parts is such that the load ring may not be able to affectively urge the legs of the crescent into completely effective sealing relationship between the parts.

DISCLOSURE OF INVENTION

In one aspect of the present invention a gas loaded face seal is provided between two facing surfaces of two relatively rotatable structures. One of the structures has a counterbore or open sided cavity in the surface facing a facing surface on the other structure. A gas-filled seal is seated in the cavity and has a sealing band in contact with the facing surface of the other structure. The sealing band has a contact surface which is tapered so that the innermost concentric edge of the contact surface is spaced from the facing surface of the other structure with the outermost concentric edge of the contact surface in contact with said facing surface of the other structure. The angle of the contact surface is constant during axial displacement of the structures.

Prior seals between relatively rotatable and relatively axially movable structures have not been completely satisfactory under special conditions of use. Seals, such as taught by Reinsma U.S. Pat. No. 3,841,718, have solved many of the problems, but still has left some problems unsolved, such as when the structures have slightly abnormal axial relative movement and during extremes of temperature, especially, cold temperatures. My improved seal has a driving portion and a sealing portion urged apart by gas pressure which may be permanently inserted in the chamber in the seal or may be changed and varied as the conditions of use change. The material of the driving portion can be the same or different from the material of the sealing portion. A sealing lip is provided which is urged toward a sealing surface to create a seal band therewith. The material of the whole seal or of the sealing portion may be permeable to the gas used in the chamber in which case a diaphragm of material not permeable to the gas is provided between the gas and the material that is permeable to the gas.

BEST MODE FOR CARRYING OUT THE INVENTION

Figure 1:
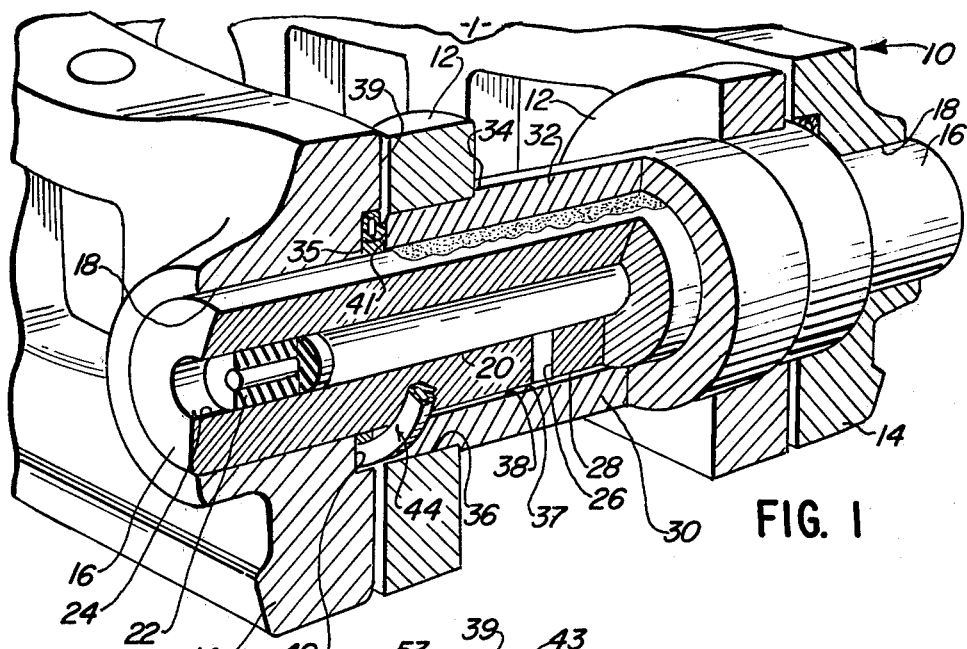
FIG. 1 is a perspective view partially in cross section of a joint between adjacent links of a track chain showing the improved gas-filled seal in position therein.

A track 10 includes a plurality of interconnected inner links 12, only one end portion of one pair of which are shown in FIG. 1, and outer links or first structures 14, only part of one pair being shown in FIG. 1. A track pin 16 is press fit in apertures 18 of the outer links 14. An oil reservoir 20 is provided in the track pin 16 by means of end plugs 22 which are nested in the ends of an opening 24 formed in said pin 16. A radial passage 26 extends from the reservoir 20 to the outer surface 28 of the track pin 16 to provide lubrication to said outer surface 28.

A bushing or second structure 30 with a raised or enlarged midportion 32 has outwardly facing shoulders 34 at the ends of said midportion. The opposite end portions of the bushing or second structure 30 are press fit into openings 36 in the inner links 12 with the links 12 bearing against the shoulders 34 so as to hold the links 12 in spaced apart relationship. The bushing or second structure 30 encircles the pin 16 and has a surface 37 of the opening 38 therein bearing on said pin 16. The lubricant from the reservoir 20 will lubricate the bearing surfaces 37,28 between the bushing or second structure 30 and the pin 16. A seal is provided between the ends of the bushing or second structure 30 and the links or first structures 14 to trap the lubricant between the pin 16 and the bushing 30 and to prevent the ingress of contaminants into said lubricating area.

Figure 2:
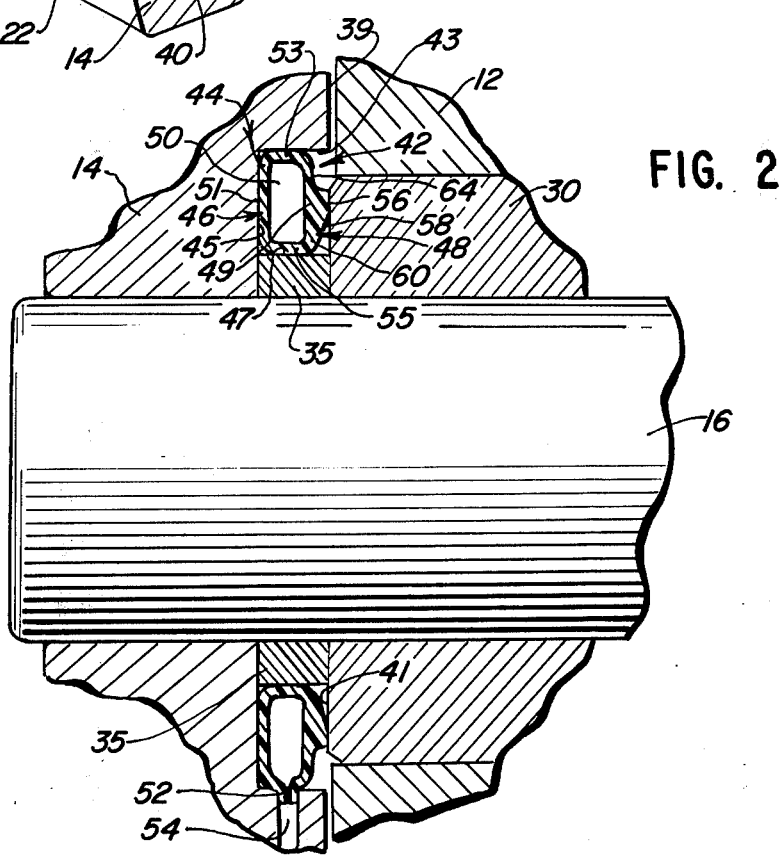
FIG. 2 is an enlarged cross-sectional view of the seal of FIG. 1.

Each link or first structure 14 has a surface 39 facing the side of the adjacent link 12 and facing a surface 41 on the end of the bushing or second structure 30. The facing surface 39 on the link or first structure 14 has a counterbore 40 formed therein. A spacer ring 35 is positioned in the counterbore 40 to define an open cavity 42 having a first end wall 43, a back wall 45, and a second end wall 47. The spacer 35 has an axial length that does not quite extend from the base of the counterbore 40 to the end of the bushing or second structure 30. A donut-shaped face seal 44 is provided in the cavity 42 and surrounds the spacer 35. The face seal 44 has a driving or back portion 46 and a sealing portion 48. In the form of the invention shown in FIG. 2, the driving portion 46 and the sealing portion 48 are integrally formed together as one continuous wall defining a gas-receiving chamber 50. The chamber 50 has a first side wall 49, a second side wall 51, a first end wall 53 and a second end wall 55. As shown in FIG. 2, an inlet valve 52 aligns with an opening 54 in the link 14 and is adapted to receive a needle or appropriate gas transfer member for adding or extracting gas to or from the chamber 50.

The driving portion 46, which includes the second side wall 51 and the first and second end walls 53, 55, is shaped to substantially conform to the space in the open cavity 42 between the spacer ring 35 and the first end wall 43 of the counterbore 40, and when seated in said cavity 42, has sufficient frictional resistance therewith that it moves with the link or first structure 14. That is, the face seal 44, when seated in the open cavity 42 and when inflated, will rotate with the link or first structue 14.

The sealing portion or first side wall 48 has a sealing band 57 with a sealing lip 56 which slopes or tapers toward the center of the seal 44 to provide a contact surface 58 which is a continuous segment of a cone, which cone has a center on the center axis of the donut-shaped seal 44. The sealing portion or first side wall 48 has a first portion or web 64 extending between the sealing band 57 and the first end wall 53 and a second portion or web 60 extending between said sealing band 57 and the second end wall 55. It will be noted that a web 60 between the sealing band 57 and the second end wall 55 of the seal 44 is thicker and has a different flexibility than the web 64 between the sealing band 57 and the first end wall 53 of the seal 44. The difference in thickness of the webs 60 and 64 allows the sealing lip 56 of the sealing band 57 to pivot about the thicker web 60 with the thinner web 64 stretching under the force applied by the gas in the chamber 50 to provide an improved seal for the lip 56 against the facing surface 41 on the bushing or second structure 30. The thicker web 60, being less flexible, will act as the pivot about which the sealing band 57 will pivot under the pressure from the gas in the chamber 50. The sealing band 57 has a center of gravity which, for purposes of illustration, is indicated by a cross 59. A first moment arm 63 and a second moment arm 61 extend from the center of gravity to the first end wall 53 and to the second end wall 55, respectively. The moment arm 63 is different from and is greater than the moment arm 61. The increased length of the moment arm 63 over moment arm 61 allows the sealing band to move axially of the band 57 about the terminus of the shorter amount arm 61.

With the chamber 50 filled with gas under pressure, the sealing lip 56 is urged against the facing surface 41 of the bushing 30 so as to provide a contact surface 58 therebetween. The extent of the contact between the lip 56, first structure and the bushing or second structure 30 will vary depending upon the amount of pressure in the chamber 50, the hardness of the material of the sealing portion 48 and, to some limited extent, the amount of wear on the lip 56 caused by extended contact with the facing surface 41 of the bushing 30.

The material of the sealing portion 48, or in the case of the seal 44 of FIG. 2 the whole face seal 44, can be any one of the elastomers, such as Butyl rubber, natural rubber, or the like, as well as plastic materials that have rubber-like properties, such as polyurethane, and the like. The gas in the chamber 50 is an inert gas, preferably nitrogen, although it may be any one of the gases, including air, but the gases should be dried so that virtually no moisture is in the chamber 50. The sealing band 57 maintains a substantially constant face angle between the contact surface 58 and the facing surface 41 on the bushing 30, and this is true even during axial displacement between the first structure or link 14 and the second structure or bushing 30. It is contemplated that the internal pressure in the seal 44 may be varied, depending on the environmental conditions and the temperature in the area where the track 10 is being used. The gas may be permanently sealed in the chamnber 50 after installation in the cavity 42, or it may be changed after installation, depending upon the needs and requirements placed on the seal 44 by the temperature and environmental conditions under which the equipment is being used.

Figure 3:
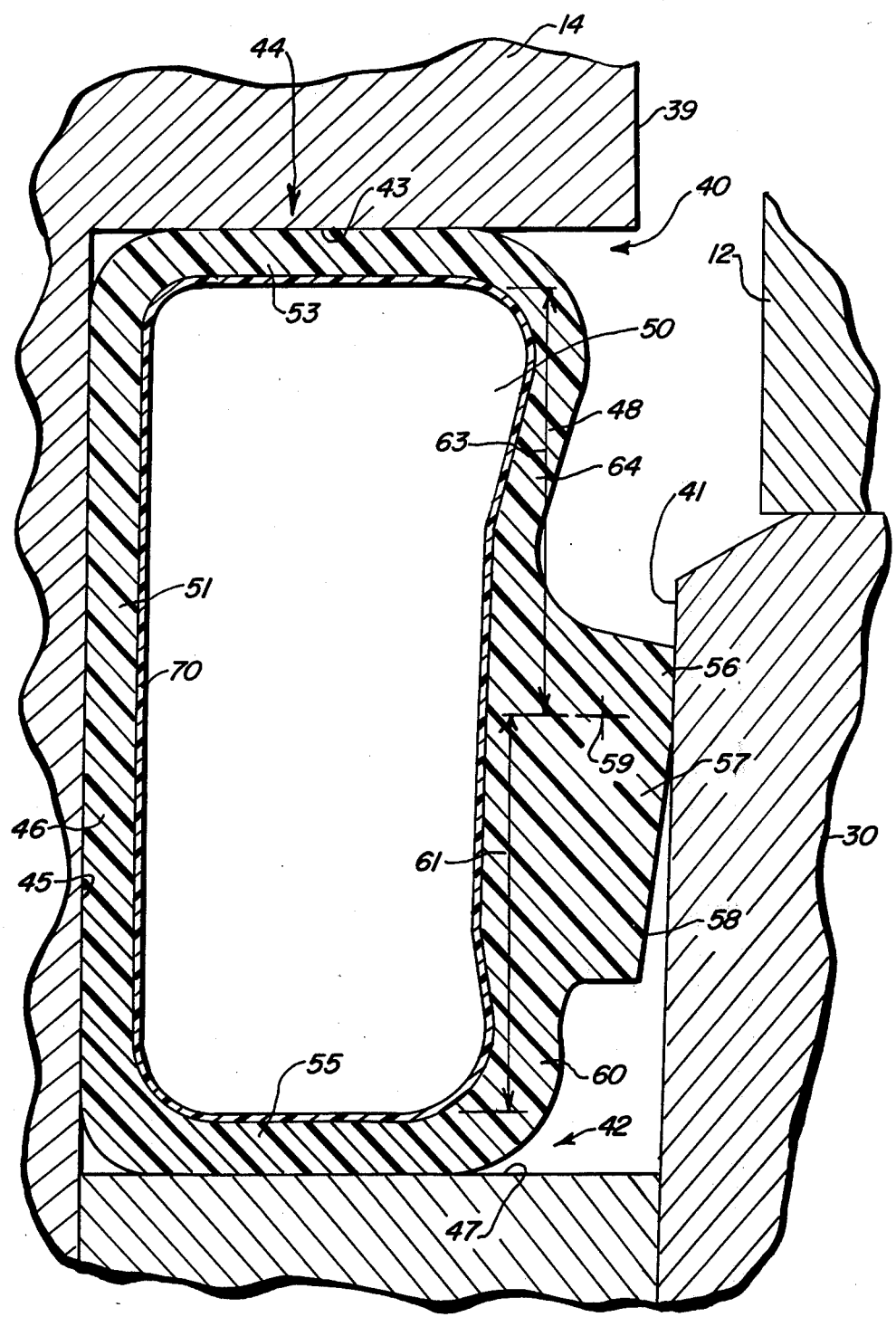
FIG. 3 is an enlarged cross-sectional view of one form of the invention.

A modified form of the invention is shown in FIG. 3 wherein the driving portion, back or second side wall 46 and the sealing portion or first side wall 48 are the same as described with respect to FIG. 1 and are both the same material. However, in the FIG. 3 version, a diaphragm 70 is provided completely throughout the inner surface of the cavity 50. The purpose of the diaphragm 70 is to protect the material of the seal 44 from reactions with the gas in the chamber 50. That is, certain of the materials of which the seal 44 is made, may have a high permeability to the gas used in the chamber 50. Under those circumstances, the material of the seal 44 is protected by a diaphragm 70 which is made of a material of low permeability to the gas so that the gas will not react with the material of the seal 44 and will not leak through the material of the seal 44. The substantially constant face angle of the sealing band 57 is clearly illustrated in FIG. 3. The thick web or second portion 60 and thin web or first portion 64 are clearly visible and function as described with respect to FIGS. 1 and 2.

Figure 4:
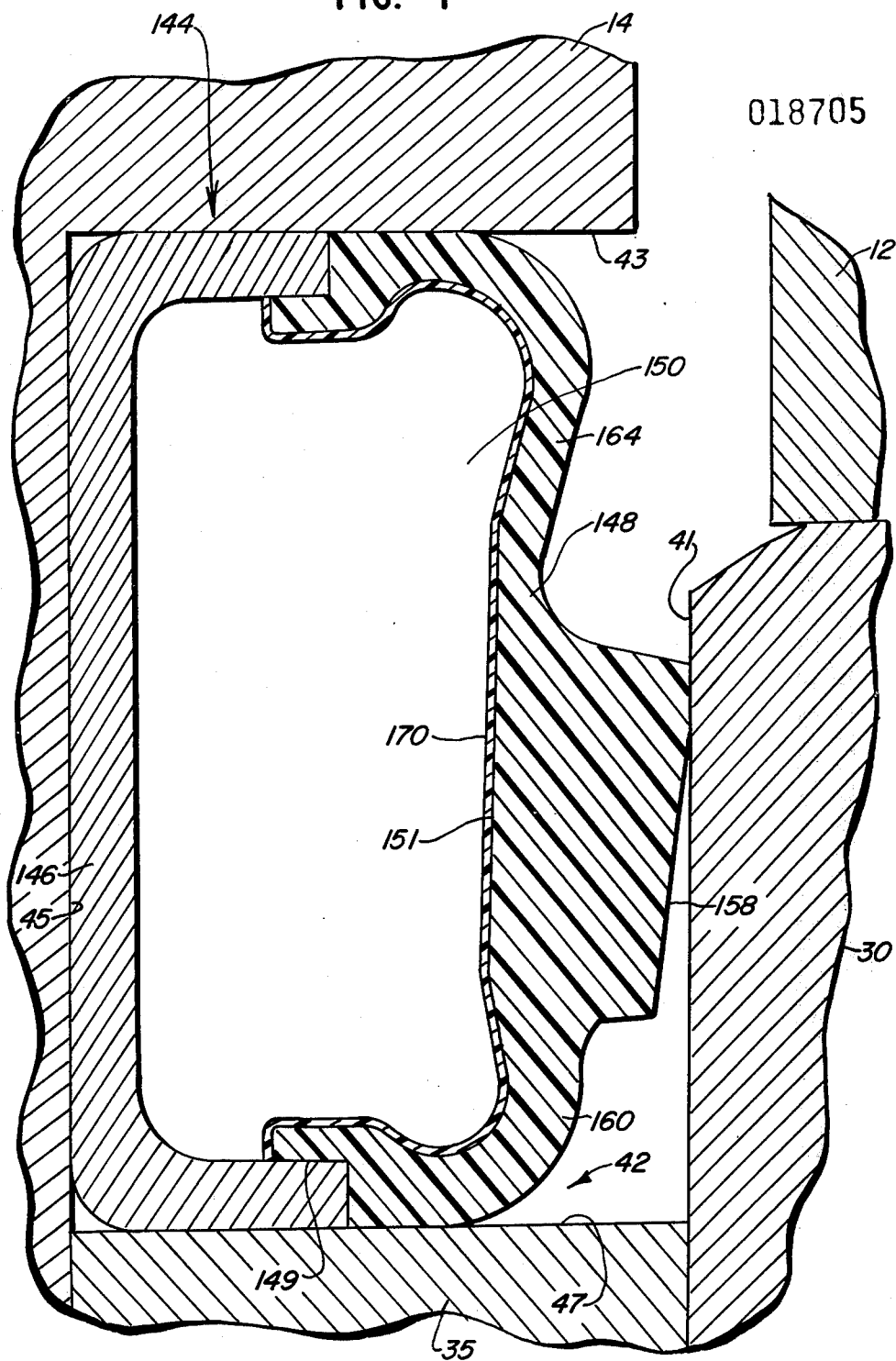
FIG. 4 is an enlarged cross-sectional view of a modified form of invention.

FIG. 4 shows a further modification of the invention wherein a metal or plastic, relatively hard, material is used to make up the driving portion or second side wall 146 of the seal 144. Under these circumstances, the dimensions of the driving portion 146 are maintained within certain tolerances so that the driving portion 146 will seat in the cavity 42 between the spacer ring 35 and the outer wall of the counterbore 40. The sealing portion or first side wall 148 of the seal is made of any of the elastomeric materials and has a recessed outer groove 149 in which the ends of the driving portion 146 nests. The sealing portion 148 is bonded to the driving portion 146 in a fluid-tight seal arrangement. The seal 144 of FIG. 4 may have a diaphragm 170 which extends throughout just the inner surface 151 of the sealing portion 148 so as to protect the material of the sealing portion 148 from the gas in the chamber 150. The use of the diaphragm 170 in FIG. 4 version is optional, depending upon the permeability of the gas to the material forming the sealing portion 148.

It will be noted that the seal 144 of FIG. 4 has the thicker web or second portion 160 at the radially inner part of the sealing portion 148 and the thinner web or first portion 164 on the radially outward part of the sealing portion 148 so as to permit the gas in the chambers 50 to flex the sealing portion 48 into sealing contact with the facing surface 41 on the bushing 30 with a substantially constant face angle between the contact face 158 and the facing surface 41 during axial displacement between the link or first structure 14 and the bushing or second structure 30.

The improved gas-filled face seal 44,144 has application in any apparatus wherein two members move relative to each other and where it is desired to create a seal between opposite sides of the seal. One such application is in the joints of the track of a track-type vehicle wherein the links pivot relative to each other, particularly as they are driven about the sprockets on the track roller frame. It has been found that the inner links 12 and bushing 30 can suddenly shift axially relative to one or the other of the outer links 14 creating unexpectedly large spaces or gaps between the ends of the bushing and the outer links 14. Using the improved gas-filled face seal 44,144, the gas under pressure urges the sealing portion 48,148 of the seal 44,144 outward so that the sealing contact surface engages with the facing surface 41 of the bushing 30 to effect the seal therebetween. The gas and sealing portion 48,148 respond instantaneously to any increase or decrease in pressure thereon so that the sealing band 57 is never broken between the lip 56 and the bushing 30, no matter how sudden or extreme the shifting of the bushing or second structure 30 with respect to the outer links or first structure 14 may be. The contact surface 58 of the sealing lip 56 remains at a substantially constant angle to the facing surface 41 during use. The pressure in the chamber 50 of the seal 44,144 can be varied to vary the loading of the sealing portion 48,148 depending upon the temperature and environment under which the seal is being used.

I claim:

1. A face seal (44) having first (48) and second (51) side walls, first (53) and second (55) end walls, and a chamber (50) defined by said walls, said walls (48,51,53,55) being of a construction sufficient for maintaining a pressurized fluid within said chamber (50), said first side wall (48) being defined by an outwardly extending sealing band (57) connected to the first (53) and second (55) end walls by respective first (64) and second (60) portions of the first side wall (48), said first (64) and second (60) portions of the first side wall (48) being of different flexibility, said first portion (64) being of greater flexibility than said second portion (60).

2. A seal assembly, comprising:
   a first structure (14) having first (43) and second (47) end walls and a back wall (45) defining an open cavity (42);
   a second structure (30) having a front wall (41) extending over at least a portion of the cavity (42) and being spaced from said first (43) end wall, said second structure (30) being movable relative to said first structure (14);
   a face seal (44) having first (48) and second (51) side walls, first (53) and second (55) end walls, and a chamber (50) defined by said walls, said walls (48,51,53,55) being of a construction sufficient for maintaining a pressurized fluid within said chamber (50), said first side wall (48) being defined by an outwardly extending sealing band (57) connected to the first (53) and second (55) end walls by respective first (64) and second (60) portions of the first side wall (48), said first (64) and second (60) portions of the first side wall (48) being of different flexibility, said first portion (64) being of greater flexibility than said second portion (60).

3. A gas-filled face seal (44,144) for use between two facing surfaces (39,41) of two relatively rotatable members (14,30), one of said members (14) having a retaining means (40) in the surface facing said other member (30), a seal (44,144) having a closed chamber (50) therein, means (52) communicating through said seal into said chamber (50) for adding or removing gas to said chamber, said seal (44,144) being seated in said retaining means (40) and having a protruding lip (56) in contact with said facing surface (41) of the other member (30), said protruding lip (56) having a contact surface (58) which tapers toward the center of the seal so that the innermost concentric edge of said contact surface (58) is spaced from said facing surface (41) of the other member (30) with the outermost concentric edge of said contact surface (58) in contact with said facing surface (41) of the other member (30), and the angle of the contact surface (58) is constant during axial displacement of said members.

4. A face seal as claimed in claim 3 wherein said means (52) communicating through said seal is a valve means and wherein the gas in said seal can be changed to accommodate for temperature and environmental changes.

5. A face seal as claimed in claim 3 wherein said retaining means (40) is a counterbore (40) formed in member (14) and said seal (44,144) seats in said counterbore.

6. A face seal as claimed in claim 3 wherein said protruding lip (56) is bounded on a radially inward side and a radially outward side by webs (60,64,160,164) connecting said protruding lip (56) to end portions of said seal (44,144), said web (60,160) on the radially inward side being thicker than said web (64,164) on the radially outward side of the lip (56), whereby said web (64,164) on the radially outward side is exposed to build up of contaminants which will inhibit its flexibility so as to render said web (64,164) on the radially outward side equally flexible to said thicker web (60,160) on the radially inward side.

7. A face seal as claimed in claim 3 wherein said means (52) in said member (14) for retaining said seal is a counterbore (40) and wherein a portion (146) of said seal seated in said counterbore (40) is a metal material and wherein a portion (148) of said seal containing the protruding lip (56) is an elastomeric material, said metal material being bonded to said elastomeric material to produce said seal.

8. A face seal as claimed in claim 7 wherein a low permeability membrane (170) is provided on the inside of said elastomeric material to reduce loss of said gas from said seal.

9. A seal as claimed in claim 3 wherein a membrane (70) is provided on the inside of said seal.

10. A seal as claimed in claim 3 wherein the gas used to inflate the seal is an inert gas.

11. A seal as claimed in claim 10 wherein the inert gas is nitrogen.

12. A seal as claimed in claim 10 wherein the inert gas is moisture-free air.

13. A seal as claimed in claim 3 wherein an inlet port (54) communicates with said means (52) and wherein said gas is an inert gas added through said port and means (52) to fill said seal.

14. A gas-filled face seal (44,144) for use between two relatively rotatable facing surfaces (39,41) of a bushing (30) and a link (14), said link (14) having a retaining means (40) in the surface facing said bushing (30), said face seal (44,144) is seated in said retaining means (40) and has a protruding lip (56) in contact with said facing surface (41) on the bushing (30), said seal having a closed chamber (50,150) therein and a valve means communicating with said chamber (50,150), said protruding lip (56) having a contact surface (58,158) which tapers inwardly toward the center of said seal so that the innermost concentric edge of said contact surface (58,158) is spaced from said facing surface (41) of said bushing (30) with the outermost concentric edge of said contact surface (58,158) in contact with said facing surface (41) of said bushing, and the angle of the contact surface (58,158) is constant during axial displacement of said bushing and said link.

15. A seal as claimed in claim 14 wherein said seal has a driving portion (146) and a sealing portion (148), said driving portion (146) seating in said counterbore (40), and said driving portion (146) and said sealing portion (148) being of different materials and being bonded to each other.

16. A seal as claimed in claim 15 wherein a low permeability membrane (170) is provided on the inside of said sealing portion (148) to reduce loss of gas through said sealing portion (148).

17. A seal as claimed in claim 14 wherein a membrane (70) of low permeability to the gas in the seal is provided on the inside of said seal.

18. A seal as claimed in claim 14 wherein the gas used to inflate the seal is an inert gas.

19. A seal as claimed in claim 18 wherein the inert gas is nitrogen.

20. A seal as claimed in claim 18 wherein the inert gas is moisture-free air.

21. A seal as claimed in claim 14 wherein an inlet port (52) is provided into the inside of said seal and wherein inert gas is added through said port (52).

* * * * *